United States Patent [19]

Ooya et al.

[11] 3,880,951

[45] Apr. 29, 1975

[54] COPOLYMER AND GRAFT BLEND EACH CONTAINING ACRYLONITRILE AND ACRYLATE COMPONENTS

[75] Inventors: Masaki Ooya; Masayasu Suzuki; Akio Kobayashi, all of Iwaki, Japan

[73] Assignee: Kureha Kagaku Kogyo Kabushiki Kaisha, Tokyo-to, Japan

[22] Filed: Mar. 17, 1972

[21] Appl. No.: 235,862

[30] Foreign Application Priority Data
Mar. 18, 1971  Japan................................ 46-15426
Dec. 10, 1971  Japan................................ 46-99489

[52] U.S. Cl.......... 260/876 R; 260/879; 260/880 R; 426/106; 426/410
[51] Int. Cl. ............................................. C08f 15/38
[58] Field of Search .... 260/876 R, 85.5 R, 85.5 ES, 260/879, 880

[56] References Cited
UNITED STATES PATENTS
2,117,321   5/1938   Hill............................... 260/85.5 ES
2,123,599   7/1938   Fikentscher et al.......... 260/85.5 ES
3,449,471   6/1969   Weitzel et al.................. 260/876 R

*Primary Examiner*—Murray Tillman
*Assistant Examiner*—J. Ziegler
*Attorney, Agent, or Firm*—Wenderoth, Lind & Ponack

[57] ABSTRACT

Synthetic resin composition having low gas permeability consisting of a blend of a first resin component which is a copolymer of acrylonitrile or methacrylonitrile and acrylic ester, and a second resin component which is a graft copolymer composed of a monomer mixture of acrylonitrile or methacrylonitrile and acrylic ester grafted upon homopolymer or copolymer of 1,3-butadiene as the trunk polymer for the graft copolymer, the content of the trunk polymer in the entire blend being determined to attain the desired result.

4 Claims, No Drawings

COPOLYMER AND GRAFT BLEND EACH CONTAINING ACRYLONITRILE AND ACRYLATE COMPONENTS

BACKGROUND OF THE INVENTION

This invention relates to a synthetic resin composition consisting of a blended copolymerized resin component (I) containing acrylonitrile or methacrylonitrile as its principal component, and a graft copolymerized resin component (II) obtained by graft polymerizing a monomer mixture containing acrylonitrile or methacrylonitrile as its principal component upon a copolymer of 1,3-butadiene and acrylic ester.

This resin composition and shaped articles manufactured therefrom possess extremely superior properties as enumerated hereinbelow:

i. Since the resin composition is excellent in its heat-stability and processability, it can be easily formed into desired articles of various configurations by using the ordinary processing method;

ii. The shaped articles to be obtained are substantially of colorless transparency like glass, hence outer appearance of the resulting product is highly attractive;

iii. Since the resin composition possesses the least odor, the shaped articles do not issue any disagreeable odor which is scarcely perceived, hence, when the resin composition is used as the packaging material for foodstuff, etc., there does not occur a single problem as to migration of such undesirable odor to the stuffed contents, change in taste of packed foods, etc.;

iv. The resin composition exhibits extremely low permeability against carbon dioxide gas, oxygen, water vapor, and others;

v. The resin composition possesses extremely high impact strength, particularly it has very small decrease in strength at a low temperature condition and maintains sufficient strength at such circumstance.

A blended resin composition of a copolymer of acrylonitrile and acrylate with acrylonitrile as its principal constituent and a copolymer of butadiene and acrylonitrile has heretofore been known. This resin composition, however, is defective in its inferior heat stability and processability. In other words, when this resin composition is hot-melt to be processed into desired articles, its heat stability extremely deteriorates, and the obtained shaped articles assume yellow or yellowish brown in color giving inferior outer appearance of the products. More undesirable defect than this is that, when the resin becomes deteriorated, very disagreeable smell comes off the resin composition. This latter point is liable, when this resin composition is used as the packaging material for foodstuffs, medicines, cosmetics, etc., to cause this odor occurred at the time of shaping to transfer or migrate to the packed contents with the result that commercial value of the packed contents is remarkably impaired. Another deficiency of this known resin composition is that it has considerably lowered impact strength at a low temperature condition, which is not suitable for the packaging material for food stuffs requiring storage in a cool place.

SUMMARY OF THE INVENTION

It is therefore the primary object of the present invention to provide a synthetic resin composition having improved heat stability, low gas permeability and other physical properties thereof which could not be attained by the known technique.

The above object as well as details of the present invention will become more apparent and readily understandable from the following description thereof when read in conjunction with the preferred examples thereof.

DETAILED DESCRIPTION OF THE INVENTION

The aforementioned deficiencies with the previously known resin composition stem mainly from the inferior heat stability of the trunk polymer constituting the graft copolymer, i.e., insufficient heat stability of the butadiene-acrylonitrile copolymer constitutes the principal cause for the problem.

The present invention is to improve heat stability and processability as well as impact strength and barrier property against gases of the resin composition to a satisfactory degree by the use of a copolymer consisting of polybutadiene or a copolymer of butadiene and one or two kinds of vinyl monomers such as acrylic ester, methylmethacrylate, and styrene.

There is known a method for improving the impact strength of the resin composition containing polyacrylonitrile as its principal constituent, wherein the rubber component is dispersed in the resin matrix. In this case, a copolymer of acrylonitrile and diene compound such as butadiene, isoprene, etc. which are regarded as an effective rubber component, and, on which a monomer mixture containing acrylonitrile as its principal component is grafted, is said to be particularly effective.

Journal of Applied Polymer Science, Vol. 13, page 2,567, (1969) as well as Belgian Patent No. 746,265 describe that, for the trunk polymer in the graft copolymer, a copolymer of butadiene and acrylonitrile is used, and that, depending on the combined quantity of acrylonitrile in this copolymer, the impact strength of the resin composition is remarkably affected. That is, for the purpose of improving the impact strength of acrylonitrile type resin composition, the trunk polymer for the graft polymer has had to be essentially a copolymer of diene compound and acrylonitrile. However, as already mentioned in the foregoing, the acrylonitrile type resin composition containing this graft copolymer possesses a fatal defect of inferior heat stability, due to which use of the resin composition has been remarkably restricted.

The present inventors, as the result of repeated and continuous experiments and researches to obtain a resin composition having no such deficiencies but sufficient impact strength and barrier property against gases, have discovered that, when a polybutadiene or a copolymer consisting of butadiene and one or two kinds of vinyl monomers selected from acrylic ester, styrene, and methylmethacrylate is used as the trunk polymer for the graft copolymer, a resin composition having the desired properties could be obtained.

The resin composition according to the present invention consists of a blend of a synthetic resin component (I) and a synthetic resin component (II), in which the content of the trunk polymer in the synthetic resin component (II) of the resin composition ranges from 5 to 20% by weight.

The first resin component (I) is a copolymer resin consisting of 50 to 85% by weight of acrylonitrile or methacrylonitrile, and 15 to 50% by weight of acrylic ester represented by the following general formula: $CH_2=CHCOOR_1$, where $R_1$ is alkyl group having 1 to 4 carbon atoms.

The second resin component (II) is a graft copolymer prepared by grafting 90 to 25 parts by weight of a monomer mixture composed of 40 to 85% by weight of acrylonitrile or methacrylonitrile and 15 to 60% by weight of acrylic ester represented by the following general formula: $CH_2 = CHOOR_1$, where $R_1$ is alkyl group having 1 to 4 carbon atoms upon 10 to 75 parts by weight of a homopolymer or copolymer of 1,3-butadiene to be the trunk polymer for the intended graft copolymer and consisting of 50 to 100% by weight of 1,3-butadiene and 0 to 50% by weight of vinyl monomer selected from styrene, acrylic ester, and methylmethacrylate.

The first resin component (I) can be manufactured by any of the generally known method such as emulsion polymerization, suspension polymerization, solution polymerization, etc., of which the emulsion polymerization and suspension polymerization are most desirable from the standpoints of economy and ease of operation. The copolymer, as already mentioned above, consists of acrylonitrile or methacrylonitrile and acrylic ester, in which acrylonitrile or methacrylonitrile occupies 50 to 85% by weight with respect to the entire copolymer and the remainder is acrylic ester.

For the acrylic ester to be used, there are methylacrylate, ethylacrylate, propylacrylate, and butylacrylate, of which methyl-and ethyl-acrylate are considered preferable from the point of the physical properties of the copolymer.

When the content of acrylonitrile in this copolymer exceeds 85% by weight, the thermoplasticity and heat stability of the copolymer becomes lowered with the consequence that shaped articles of colorless transparency can hardly be obtained. Also, when the content of acrylonitrile becomes lower than 50% by weight, mechanical property and barrier property against gases of the shaped articles become lowered, which is not desirable from the standpoint of the intended purpose of use of such shaped articles.

The second resin component (II) is prepared by graft copolymerizing a monomer mixture composed of a nitrile group containing monomer such as acrylonitrile or methacrylonitrile, and acrylic ester upon a polybutadiene or a copolymer of 1,3-butadiene and one or two kinds of vinyl monomers selected from acrylic ester, styrene, and methylmethacrylate as the trunk polymer for the grafting.

The trunk polymer for the graft copolymer, as mentioned above, is a polybutadiene or a copolymer of 1,3-butadiene and one or two kinds of vinyl monomers selected from acrylic ester, styrene, and methylmethacrylate, of which acrylic ester is one containing therein residual radical of alcohol having 1 to 8 carbon atoms. The content of this vinyl monomer in the copolymer should not exceed 50% by weight, beyond which no sufficient impact strength can be obtained.

The monomer mixture to be grafted on the trunk polymer is composed of either one of acrylonitrile or methacrylonitrile having the nitrile group and acrylic ester. Acrylic ester of the same kinds as used in producing the resin component (1) may be used in this second resin component. In this case, the quantity of the trunk polymer in the graft copolymer ranges from 10 to 75% by weight.

In order to obtain sufficient impact strength in the resin composition according to the present invention with a small amount of the graft copolymer, it is desirable that the content of the trunk polymer graft be as large as possible, although, when the content thereof exceeds 75% by weight, the second resin component (II) loses sufficient compatibility with the first resin component (I) with the consequent decrease in the impact strength. Also if the content of the trunk polymer is below 10% by weight, the impact strength does not meet the required standard.

The nitrile group containing monomer contained in the graft component is from 40 to 85% by weight. The content beyond 85% by weight would cause decrease in the thermal stability of the resin composition, and the shaped articles assume a yellowish brown color. On the other hand, the content of below 40% by weight does not produce sufficient compatibility between the resin components (I) and (II), hence inferior impact strength.

The graft copolymer of the second resin component (II) can be produced by the heretofore known methods such as solution-, bulk-, and emulsion-polymerization. Of these three methods, the emulsion polymerization is the easiest and most preferable method.

The blend ratio of this first resin component (I) and the second resin component (II) for the resin composition is such that the content of the trunk polymer of the second resin component (II) be maintained within the range of 5 to 20% by weight. Outside this range, no sufficient physical properties of the resin composition can be assured. That is, when the trunk polymer content is less than 5%, the impact strength of the resin composition becomes inferior, and when the content is above 20%, the barrier property against gases as well as the mechanical property of the resin composition become inferior.

The first resin component (I) and the second resin component (II) in the resin composition can be blended by any known method such as in latex form or powder form.

In order to enable skilled persons in the art to reduce the present invention into practice, the following preferred examples are given. It should, however, be noted that these examples are illustrative only, and that any change may be made within the ambit of the invention as afforded by the appended claims.

EXAMPLE 1 a. Preparation of the resin component (1)

The following materials were charged into an autoclave, and subjected to polymerization for 15 hours by adjusting the reaction temperature to 50°C, while agitating.

| Component | Part by Weight |
|---|---|
| Acrylonitrile | 75 |
| Methylacrylate | 25 |
| n-dodecyl mercapton | 1.0 |
| $K_2S_2O_8$ | 0.04 |
| $NaHSO_3$ | 0.01 |
| OTP (*) | 1.0 |
| Water | 200 |

(Note:
(*): Manufactured and sold by Kao-Atlas Co., Japan under a trademark "Pelex OTP", the principal constituent of which is sodium dioctyl sulfosuccinate.)

Upon completion of the polymerization reaction, the yielded latex was taken out of the autoclave, to which 20 parts by weight of 4% aqueous solution of $Al_2(SO_4)_3$ was added for salting-out, thereby making the latex in slurry form. This latex was further heated to a temperature of 80°C, and then filtered, washed with water, and dried. As the result, a copolymer in white powder was obtained at a rate of yield of 96%.

The copolymer was found to have its reduced viscosity ($\eta_{SP}/C$) of 0.114 (C = 4g/1) at a temperature of 30°C in dimethylformamide solution.

b. Preparation of the resin component (II)

The following materials were charged into the autoclave.

| Component | Part by Weight |
|---|---|
| 1,3-butadiene | 40 |
| Methylacrylate | 10 |
| Tert-dodecyl mercaptan | 0.25 |
| Diisopropylbenzene hydroperoxide | 0.1 |
| FeSO$_4$. 7H$_2$O | 0.002 |
| EDTA . 2Na salt (**) | 0.003 |
| Rongalite | 0.05 |
| Na$_4$P$_2$O$_7$. 10H$_2$O | 0.05 |
| OTP | 0.5 |
| Water | 150 |

(Note:
(**) EDTA = Ethylene Diamine Tetraacetic Acid)

Upon completion of the polymerization reaction in 16 hours at a temperature of 40°C with agitation, latex was obtained at a rate of yield of 98%. Subsequently, 10 parts by weight of water containing therein 0.25 part by weight of OTP and 0.25 part by weight of Emulgen 910 (product of Kao-Atlas Co., Japan, the principal constituent of which is

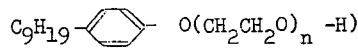

was added to the latex and agitated for 1 hour.

Thereafter, the following mixture components were further added to the latex and reacted for 16 hours at 40°C, while agitating.

| Component | Part by Weight |
|---|---|
| Acrylonitrile | 32.5 |
| Ethylacrylate | 17.5 |
| Diisopropyl benzene hydroperoxide | 0.1 |
| Rongalite | 0.05 |
| Water | 140 |

Upon completion of the reaction, a benzene solution containing therein 1 part by weight of 3,5-di-tertiary-butyl-4-hydroxy toluene (BHT) and 0.5 part by weight of dilauryl thio-dipropionate (DLTDP) which had been emulsified by aqueous solution of OTP was added to the reaction product. Then, the resulting emulsion was taken out of the autoclave and 20 parts by weight of 4% aqueous solution of Al$_2$(SO$_4$)$_3$ was added for salting-out and coagulation. When the coagulated product was heat-treated at a temperature of 60°C, filtered, washed with water, and dried, a graft copolymer in white powder was obtained at a rate of yield of 96%.

Comparative Example for Preparation of Resin Component (II)

When the following components were charged into the autoclave and subjected to polymerization reaction by agitating the batch for 16 hours at a temperature of 40°C, a copolymer latex of butadieneacrylonitrile (B-AN latex) was obtained at a rate of yield of 98%.

| Component | Part by Weight |
|---|---|
| 1,3-butadiene | 40 |
| Acrylonitrile | 10 |
| Tert-dodecyl mercaptan | 0.25 |
| Diisopropyl benzene hydroperoxide | 0.1 |
| FeSO$_4$. 7H$_2$O | 0.002 |
| EDTA . 2Na salt | 0.003 |
| Rongalite | 0.05 |
| Na$_4$P$_2$O$_7$. 10H$_2$O | 0.05 |
| P—OTP | 0.5 |
| Water | 150 |

Next, monomer mixtures of acrylonitrile and ethylacrylate of the various mixing ratios as shown in the following Table were graftpolymerized on the B-AN latex in the same manner as described in Example 1 above. The thus obtained latex was treated for the resin component (II).

| Mixture No. | 1 | 2 | 3 | 4 | 5 | 6 |
|---|---|---|---|---|---|---|
| Acrylonitrile | 35 | 32.5 | 30 | 49 | 45.5 | 42 |
| Ethyl acrylate | 15 | 17.5 | 20 | 21 | 24.5 | 28 |
| B-AN latex 50 (solid content) | 50 | 50 | 50 | 30 | 30 | 30 |

The resin components (I) and (II) obtained by Example 1 and Comparative Example were blended by a Henschel blender at the mixing ratio shown in the following Table 1, and homogeneously kneaded by rolls at a rolling temperature of 165°C for 3 minutes to shape the blended resin composition into a sheet form. This sheet was further pressed by a pressing machine for 10 minutes at a temperature of 200°C under a pressure of 200 kg/cm$^2$ to produce test specimens.

The test specimens were tested for their gas permeability, mechanical as well as thermal properties, the results of which are shown in the following Table 1.

Table 1

| | Ref. Sample | Invention | Invention | Invention | Invention |
|---|---|---|---|---|---|
| Resin component (I)(wt. parts) | 100 | 80 | 75 | 70 | 60 |
| Resin component (II)(wt. parts) | 0 | 20 | 25 | 30 | 40 |
| CO$_2$ gas Permeability (cc.cm/cm$^2$.sec .cmHg) | 0.15 × 10$^{-12}$ | 0.5 × 10$^{-12}$ | 0.6 × 10$^{-12}$ | 0.8 × 10$^{-12}$ | 1.0 × 10$^{-12}$ |
| Moisture permeability (250 microns thick) (g/m.24 hrs.) | 5 | 5 | 5 | 5 | 7 |
| Tensile strength at breaking point (kg/cm$^2$) | 980 | 940 | 860 | 840 | 580 |
| Thermal deformation temp. (°C) | 82 | 81 | 80 | 79 | 76 |
| Parallel light beam transmission(%) | 87 | 84 | 84 | 82 | 76 |

Table 1 — Continued

|  | Ref. Sample | Invention | Invention | Invention | Invention |
|---|---|---|---|---|---|
| Haze value (%) | 4 | 5 | 5 | 6 | 11 |
| Izod impact strength (v/notch) kg.cm/cm$^2$ | | | | | |
| 23°C | 2.5 | 68 | 98 | 120 | 130 |
| 0°C | 2.0 | 22 | 28 | 35 | 40 |
| −10°C | 2.0 | 15 | 20 | 25 | 28 |
| Color tone | light yellow | light yellow | light yellow | light yellow | light yellow |
| Odor | not sensed | not sensed | not sensed | not sensed | not sensed |

Table 1a

| Item \ Comparative Specimen No. | 1 | 2 | 3 | 4 | 5 | 6 |
|---|---|---|---|---|---|---|
| Resin component (I) (part by weight) | 80 | 80 | 80 | 70 | 60 | 70 |
| Resin component (II) (part by weight) | 20 | 20 | 20 | 30 | 30 | 30 |
| $CO_2$ gas permeability (cc.cm/cm .sec.cmHg) | $0.5 \times 10^{-12}$ | $0.5 \times 10^{-12}$ | $0.6 \times 10^{-12}$ | $0.5 \times 10^{-12}$ | $0.5 \times 10^{-12}$ | $0.6 \times 10^{-12}$ |
| Moisture permeability (g/m$^2$, 24 hrs.) | 6 | 6 | 6 | 6 | 6 | 6 |
| Parallel light beam transmission (%) | 82 | 81 | 78 | 82 | 80 | 80 |
| Haze value (%) | 6 | 8 | 10 | 6 | 8 | 10 |
| Izod impact strength (v/notch) (kg.cm/cm$^2$) | | | | | | |
| 23°C | 65 | 70 | 72 | 81 | 78 | 86 |
| 0°C | 10 | 14 | 15 | 10 | 12 | 15 |
| −10°C | 5 | 8 | 10 | 5 | 6 | 8 |
| Color tone | | yellowish brown | | | yellowish brown | |
| Odor | | disagreeable smell | | | disagreeable smell | |

Note:
Measurements for the physical properties were conducted in accordance with the following prescribed test methods.
a. $CO_2$ gas permeability : ASTM D-1434-66
b. Moisture permeability : ASTM E-96-66
c. Tensile strength at breaking point : JIS K-6734
d. Thermal deformation temp. : ASTM D-648-56
e. Parallel light transmission : JIS K-6714
f. Odor : Pressed sheet of the resin compositions having a thickness of 1 mm was cut into a strip of a total surface area of 240 cm$^2$. The strips were then immersed for 24 hours in 300 ml of water maintained at a temperature of 60°C contained in a glass container with tight stopper, after which the strips were taken out and the water is tested for its smell by organoleptic method.

It will be understood from the foregoing Tables 1 and 1a that the resin compositions obtained by Example 1 of the present invention are extremely superior in their color tone and odor to those of the comparative samples, and, moreover, they show only a small decrease in the impact strength at a low temperature, thereby showing sufficient strength. In contrast to this, the resin compositions of the comparative examples assume a yellowish brown color tone and issue a very disagreeable smell. Lowering of the impact strength at a low temperature condition is also considerable.

EXAMPLE 2

Syntheses of the resin components (I) and (II) was followed exactly as in Example 1 above, except that the composition of the trunk polymer for the resin component (II) was changed to the ratios as shown in the following table.

|  | A | B | C | D | E | F | G | H | I |
|---|---|---|---|---|---|---|---|---|---|
| Butadiene -1,3 | 45 | 32.5 | 30 | 40 | 30 | 50 | 40 | 40 | 40 |
| Methylacrylate | 5 | 12.5 | 20 | 0 | 0 | 0 | 5 | 0 | 0 |
| Ethylacrylate | 0 | 0 | 0 | 10 | 20 | 0 | 0 | 0 | 0 |
| Styrene | 0 | 0 | 0 | 0 | 0 | 0 | 5 | 0 | 5 |
| Methylmethacrylate | 0 | 0 | 0 | 0 | 0 | 0 | 0 | 10 | 5 |

In every case of using the trunk polymers having varying compositional ratio, the graft polymer in white powder form could be obtained. These resin components (II) were blended with the resin component (I) of Example 1 above by the Henschel blender at a mixing ratio of 25/75 (resin component (II)/resin component (I) ), and the blended compositions were measured for their impact strength, the results of which are as shown in the following Table 2.

Table 2

|  | A | B | C | D | E | F | G | H | I |
|---|---|---|---|---|---|---|---|---|---|
| Izod impact strength (kg.cm/cm$^2$) at 23°C | 82 | 71 | 52 | 96 | 58 | 110 | 94 | 58 | 86 |

EXAMPLE 3

The same procedures as in Example 1 above were followed, except that the monomer compositions of the graft component in the resin component (II) were made according to the ratios as shown in the following Table.

| Code No. | Trunk Polymer 1,3-butadiene | Trunk Polymer ethylacrylate | Graft Component acrylonitrile | Graft Component ethylacrylate |
|---|---|---|---|---|
| (J) | 40 | 10 | 27.5 | 22.5 |
| (K) | 40 | 10 | 30.0 | 20.0 |
| (L) | 40 | 10 | 32.5 | 17.5 |
| (M) | 40 | 10 | 35.0 | 15.0 |

In every case, graft copolymer in white powder form was obtained at a rate of yield of 96%.

Each of these resin components (II) was blended with the resin component (I) of Example 1 by the Henschel blender in such a manner that the blending ratio of the resin component (II) become 25% by weight. Thereafter, the resin composition thus obtained was made into test specimens for measurements of various physical properties. The results are as shown in the following Table 3.

Table 3

|  | J | K | L | M |
|---|---|---|---|---|
| $CO_2$ gas permeability (cc.cm/cm$^2$.sec.cmHg) | 0.6×10$^{-12}$ | 0.6×10$^{-12}$ | 0.5×10$^{-12}$ | 0.5×10$^{-12}$ |
| Moisture permeability (250 microns thick) (g/m$^2$.24 hrs.) | 5 | 5 | 5 | 5 |
| Tensile strength at breaking point (kg/cm$^2$) | 940 | 940 | 960 | 960 |
| Thermal deformation temp.(°C) | 80 | 80 | 80 | 80 |
| Parallel light beam transmission (%) | 82 | 83 | 84 | 84 |
| Haze value (%) | 6 | 5 | 4 | 4 |
| Izod impact strength (v/notch) (kg.cm/cm$^2$) at 23°C | 83 | 102 | 97 | 78 |

EXAMPLE 4

The resin component (I) in Example 1 and a blend of the resin component (I) and the resin component (II) in the same Example to contain 20% by weight of the latter were respectively made into a bottle of 35 g in weight and 300 ml in internal volume by first extruding the resin material through an extruder of 50 mm in diameter and then blow-molding the extruded parison.

The temperature of the molten resin as extruded was 210°C. The outer appearance of the bottle obtained by using any of the abovementioned resin materials was found to be colorless transparent and extremely clear. Almost no odor could be sensed, nor was there recognized any difference in odor between the bottle obtained from the resin component (I) alone and that obtained from the resin composition containing the resin component (II).

Further, these two bottles were filled with distilled water of 60°C and tightly closed by a stopper, after which they were kept in air bath maintained at a temperature of 60°C for 24 hours. Then, the distilled water was examined for its taste and smell. No odor was found to have migrated from the bottles into the water, and the water was perfectly odorless and free of any undesirable taste.

Again, the bottle produced from the resin composition containing 20% by weight of the resin component (II) was filled with 300 ml of water at 23°C, and the bottle was dropped from a height of 2 m. No damage occurred with the bottle. On the other hand, the bottle produced from the resin component (I) alone was damaged at a damage rate of 60%.

EXAMPLE 5 a. Preparation of resin component (I)

The following materials were charged into an autoclave, and agitated for 24 hours by regulating the reaction temperature at 60°C.

| Component | Part by Weight |
|---|---|
| Methacrylonitrile | 85 |
| Methylacrylate | 15 |
| n-dodecyl mercaptan | 0.25 |
| $K_2S_2O_8$ | 0.08 |
| $NaHSO_3$ | 0.02 |
| OTP | 0.05 |
| Water | 300 |

Upon completion of the polymerization reaction, resulted latex was taken out of the autoclave, to which 20 parts by weight of 4% aqueous solution of $Al_2(SO_4)_3$ was added for salting-out, thereby making the latex in slurry form. This latex was further heated to a temperature of 80°C, and then filtered, washed with water, and dried. As the result, a copolymer in white powder form was obtained at a rate of yield of 94%.

The copolymer was found to have a reduced viscosity ($\eta_{SP}$/C) of 0.098 (1/g) (C = 4g/1 ).

b. Preparation of resin component (II)

The following materials were charged into the autoclave, the remaining internal space of which was perfectly substituted for nitrogen, thereafter the charged materials were agitated for 16 hours by regulating the reaction temperature to 40°C.

| Component | Part by Weight |
|---|---|
| 1,3-butadiene | 40 |
| Ethylacrylate | 10 |
| Tert-dodecyl mercaptan | 0.25 |
| Diisopropyl benzene hydroperoxide | 0.1 |
| $FeSO_4.7H_2O$ | 0.002 |
| EDTA.2Na salt | 0.003 |
| Rongalite | 0.05 |
| $Na_4P_2O_7.10H_2O$ | 0.05 |
| OTP | 0.05 |
| Emulgen | 0.5 |
| Water | 150 |

To the resulting latex, 20 parts by weight of water containing therein 1.5 part by weight of "Emulgen" was added and the batch was agitated for 1 hours. Thereafter, the following monomer mixture was further added to the latex and the whole batch was agitated for 16 hours, while adjusting the reaction temperature to 40°C.

| Component | Part by Weight |
|---|---|
| Methacrylonitrile | 32.5 |
| Ethylacrylate | 17.5 |
| Diisopropyl benzene hydroperoxide | 0.1 |
| Rongalite | 0.05 |
| Water | 130 |

Upon completion of the reaction, a benzene solution containing therein 1 part by weight of di-tertiary-butyl-hydroxy toluene and 0.5 part by weight of nonylphenyl phosphite which had been emulsified by aqueous solution of OTP was added to the reaction product. Then, the resulting emulsion was taken out of the autoclave and 20 parts by weight of 4% aqueous solution of $Al_2(SO_4)_3$ was added to it for salting-out and coagulation. When the coagulated product was further heat-treated at a temperature of 60°C, filtered, washed with water, and dried, a graft copolymer in white powder form was obtained at a rate of yield of 96%.

The resin components (I) and (II) thus obtained were blended by a Henschel blender at varying mixing ratios as shown in the following Table 4, homogeneously kneaded by rolls at a rolling temperature of 170°C for 3 minutes to shape the blended resin composition into sheet form. This sheet was further pressed by a pressing machine for 10 minutes at a temperature of 200°C under a pressure of 200 kg/cm² to produce test specimens. The measured results of the physical properties of these test specimens are shown in the following Table 4.

Table 4

| | | | |
|---|---|---|---|
| Resin component (I) (part by weight) | 80 | 75 | 70 |
| Resin component (II) (part by weight) | 20 | 25 | 30 |
| $CO_2$ gas permeability (cc.cm/cm².sec.cmHg) | $0.5 \times 10^{-12}$ | $0.6 \times 10^{-12}$ | $0.8 \times 10^{-12}$ |
| Moisture permeability (g/m².24 hrs/250 $\mu$) | 4 | 4 | 4 |
| Thermal deformation temp. (°C) | 89 | 88 | 88 |
| Izod impact strength (v/notch) (kg.cm/cm²) 23°C | 16 | 32 | 48 |

What we claim is:

1. A synthetic resin composition of low gas permeability, consisting essentially of a blend of a first resin component and a second resin component, wherein the first resin component is a copolymer consisting essentially of
   1. 50 to 85% by weight of a monomer selected from the group consisting of acrylonitrile and methacrylonitrile, and
   2. 15 to 50% by weight of an acrylic ester represented by the formula $CH_2 = CHCOOR_1$ wherein $R_1$ is alkyl of 1 to 4 carbon atoms, and the second resin component is a graft copolymer consisting essentially of 90 to 25 parts by weight of a monomer mixture consisting essentially of
   1. 40 to 85% by weight of a monomer selected from the group consisting of acrylonitrile and methacrylonitrile, and
   2. 60 to 15% by weight of an acrylic ester represented by the formula $CH_2 = CHCOOR_1$ wherein $R_1$ is alkyl of 1 to 4 carbon atoms grafted upon 10 to 75 parts by weight of a polymeric substance to be the trunk polymer for the graft copolymer, which polymeric substance is a copolymer of
   3. 50 to 90% by weight of 1,3-butadiene, and
   4. 10 to 50% by weight of at least one vinyl monomer selected from the group consisting of styrene, methyl methacrylate and esters of acrylic acid wherein the alcohol radical has 1–8 carbon atoms, the content of the trunk polymer in the second resin component being from 5 to 20% by weight of the entire blended resin composition.

2. The synthetic resin composition according to claim 1, wherein the acrylic ester for the first resin component is selected from the group consisting of methyl acrylate, ethyl acrylate, propyl acrylate and butyl acrylate.

3. The synthetic resin composition according to claim 1, wherein the acrylic ester (2) for the second resin component is selected from the group consisting of methyl acrylate, ethyl acrylate, propyl acrylate and butyl acrylate.

4. The synthetic resin composition according to claim 1, wherein the acrylic ester of the polymeric substance for the trunk polymer is selected from the group consisting of methyl acrylate, ethyl acrylate, propyl acrylate, butyl acrylate and methyl methacrylate.

* * * * *